United States Patent [19]

Howland et al.

[11] 4,108,338

[45] Aug. 22, 1978

[54] ROTARY TABLETTING PRESS WITH POWDER FEED ADJUSTMENT VALVE

[75] Inventors: Paul George Howland, Willow Grove; John Mergle Alexander, Philadelphia, both of Pa.

[73] Assignee: Pennwalt Corporation, Philadelphia, Pa.

[21] Appl. No.: 824,762

[22] Filed: Aug. 15, 1977

[51] Int. Cl.[2] .......... B29C 3/00; B30B 11/08

[52] U.S. Cl. .......... 222/286; 222/316; 222/317; 222/461; 222/502; 425/353

[58] Field of Search .......... 425/353, 354, 355; 222/196, 200, 285, 286, 316, 317, 410, 460, 461, 502, 503, 517, 555, 560

[56] References Cited

U.S. PATENT DOCUMENTS

| | | | |
|---|---|---|---|
| 1,061,348 | 5/1913 | Willford | 222/286 |
| 2,833,443 | 5/1958 | Prickett et al. | 222/146 HE |
| 3,999,922 | 12/1976 | Shimada | 425/353 X |
| 4,050,865 | 9/1977 | Drostholm et al. | 425/354 X |

*Primary Examiner*—Robert B. Reeves

*Assistant Examiner*—David A. Scherbel

*Attorney, Agent, or Firm*—Charles N. Quinn

[57] ABSTRACT

A rotary tabletting press, including a die table rotatable about an axis, has improved apparatus for feeding powder to the table. The improved feed apparatus includes a rotatably sliding valve at a discharge orifice at the bottom of a powder storage hopper, a conduit conveying powder from the hopper to the die table and apparatus which adjustably maintains the discharge end of the conduit a preselected distance above the die table.

12 Claims, 6 Drawing Figures

ROTARY TABLETTING PRESS WITH POWDER FEED ADJUSTMENT VALVE

BACKGROUND OF THE INVENTION

1. Field of the Invention

This invention relates to rotary tabletting presses with die tables, having generally planar upper surfaces, rotatable about an axis. A press of this type is disclosed in U.S. Pat. No. 3,545,007.

2. Description of the Prior Art

Heretofore rotary tabletting presses have used conduits, fixedly extending from an elevated powder storage hopper, to transfer tabletting powder from the hopper to the preferably horizontal upper surface of a rotatable die table located below the hopper. Means for stopping powder flow consisted of a single moveable plate, resident in a groove and slidable into the conduit to block powder flow.

These sliding plates inherently possess a substantial disadvantage: when the plate slides from the open position to a closed position at which powder flow is blocked, some powder is inevitably caught and compressed between the plate and the groove. Repeated movement of the plate between open and closed positions results in more powder being caught and compressed between the plate and the groove, with consequent buildup of compressed powder. Indeed, certain materials can render the slidable plate inoperative due to material buildup in the groove. Eventually the compressed powder breaks loose, falling through the conduit and into a die cavity in the die table, where the compressed powder, along with uncompressed free-flowing powder, is pressed into a tablet. The tablet, made at least partially from already compressed powder, contains a greater mass of powder than tablets formed entirely of uncompressed powder and hence may be outside specification limits for the tablets being produced.

In the presses known heretofore, when it is desired to change the gap between the powder feed conduit discharge end and the die table, the entire powder feed hopper must be moved, since the powder feed conduit is fixed thereto. This is quite cumbersome. Additionally, when it is desired to change tools in conventional machines, the entire hopper must be removed in order to move the powder feed conduit away from the die table to provide workers with access to the die table. Again, this is cumbersome.

In tabletting presses it is desirable to be able to perform regular machine cleaning, maintenance, and tool set removal and replacement without disturbing the powder supply and without altering the powder's physical properties. It is also desirable to be able to quickly adjust powder flow without disturbing the powder supply contained in the hopper, to regulate powder head and powder flow within a powder feed frame on the press die table. Tabletting presses known heretofore, with powder flow conduits fixed relative to the storage hopper, do not conveniently provide such capabilities.

SUMMARY OF THE INVENTION

This invention provides a rotary tabletting press with improved powder feed apparatus which facilitates (1) shut off and throttling of powder flow from the hopper, (2) easy removal of the powder feed frame from the press without disturbing the powder supply and (3) rapid adjustment of powder flow rate and powder head within the feed frame as powder is delivered through the conduit to the die table. The apparatus includes an improved valve for closing or partially closing a discharge orifice at the bottom of the powder storage hopper, a preferably telescoping conduit conveying powder from the hopper to the rotatable die table and rapidly adjustable apparatus for maintaining the conduit discharge end a preselected distance above the die table. The improved valve reduces the possibility of powder being caught and compressed as the valve closes, thereby reducing the chance of precompressed, high density powder being delivered to the die table.

DESCRIPTION OF THE PREFERRED EMBODIMENTS

Figure 1:
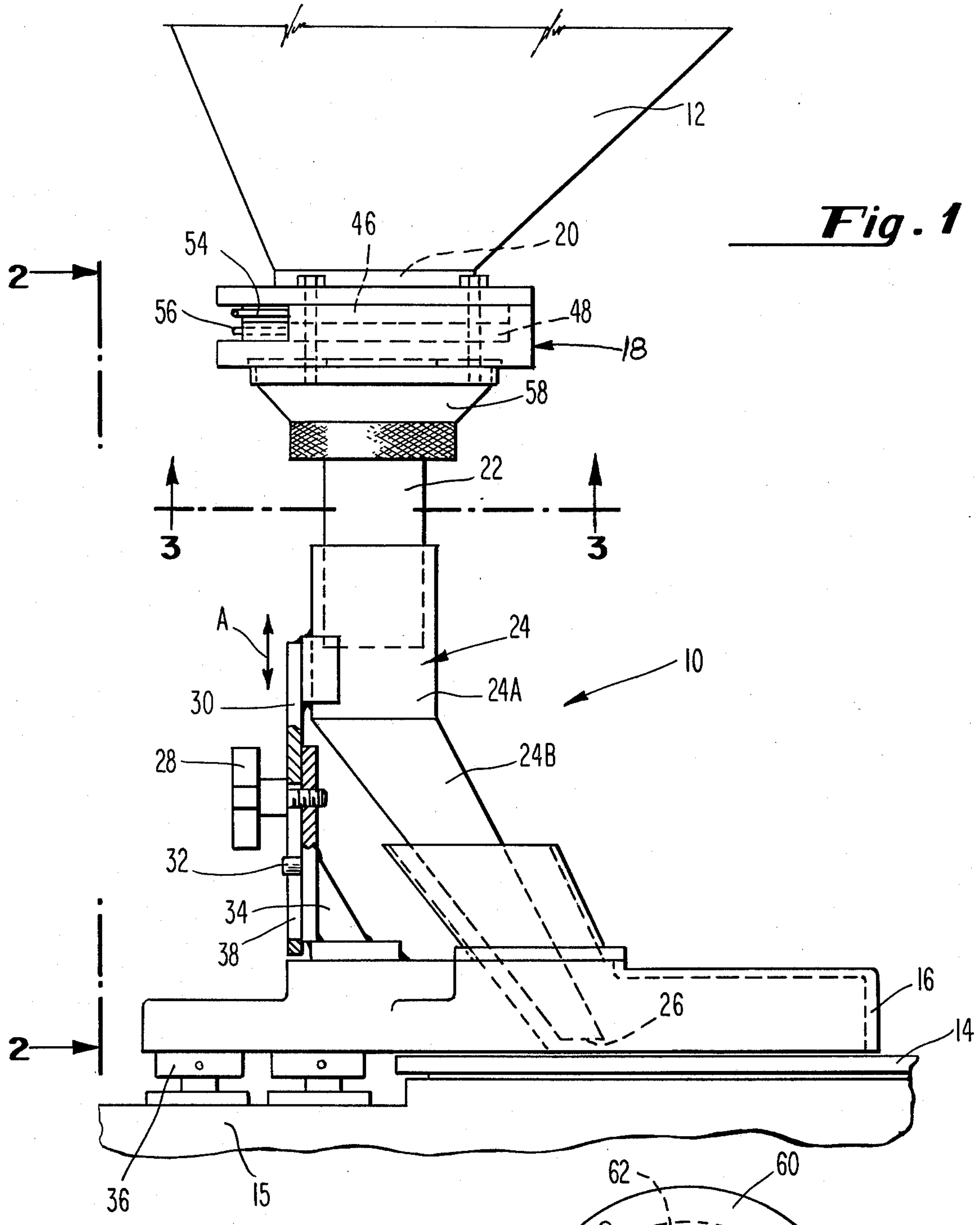
FIG. 1 is a side elevation view of the powder feed apparatus.

Referring to FIG. 1, the improved powder feed apparatus is designated generally 10 and conveys powder from a hopper 12 to an upper planar surface of a preferably horizontal rotatable die table 14. The powder feed apparatus includes a valve designated generally 18, a funnel 58, first and second conduits designated 22 and 24 respectively and a powder feed frame 16. When valve 18 is open, powder flows from hopper 12 through valve 18, funnel 58, and first and second conduits 22 and 24 to the interior of feed frame 16, exiting second conduit 24 through discharge end 26. Feed frame 16 surrounds discharge end 26 of second conduit 24. The lower surface of feed frame 16 is preferably parallel to the upper surface of table 14 and separated therefrom by a small gap, typically about 0.003 inches. The distance between discharge end 26 and die table 14 is adjustable, to facilitate control of powder flow rate to the die table. Second conduit 24 is moveable vertically as designated by arrow A and is held in place by height adjusting screw 28. Conduit vertical support member 30 has a vertical slot, not visible in FIG. 1, within which the shaft of screw 28 and a guide pin 32 reside. Upstanding support member 34 has guide pin 32 extending horizontally therefrom and also has a threaded receptacle for height adjusting screw 28. Conventional feed frame adjusting screws 36 connect feed frame 16 to the press frame 15, and are used to adjust the height of feed frame 16 above table 14.

First and second conduits 22 and 24 are in sliding telescopic engagement. This facilitates vertical movement of second conduit 24 while first conduit 22 remains stationary, secured to hopper 12 by means of funnel 58 and valve 18. Powder cannot escape from the juncture of conduits 22 and 24 so long as they are in the assembled position, in telescopic engagement.

Figure 2:
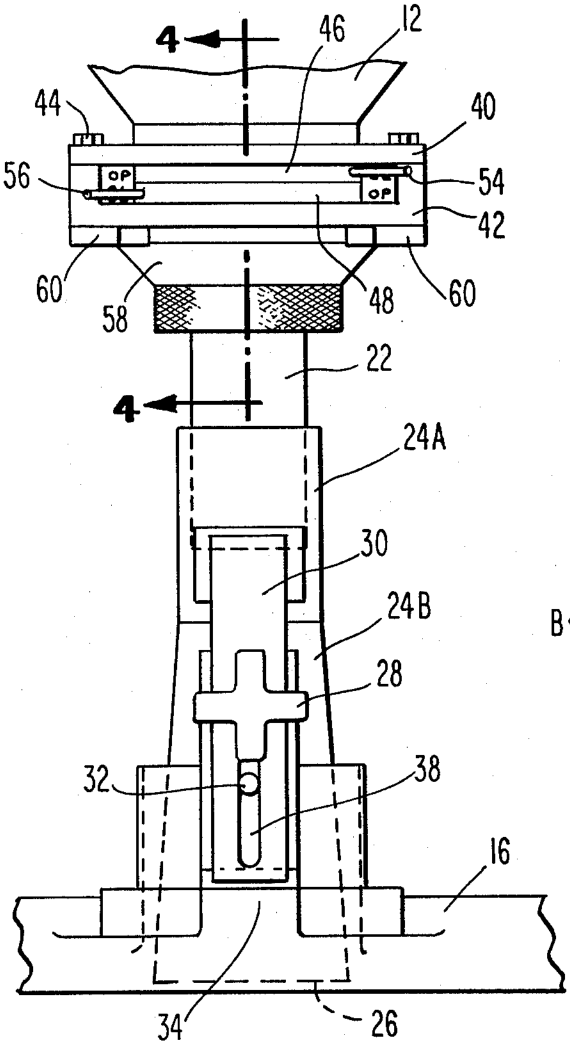
FIG. 2 is another side elevation view of a portion of the powder feed apparatus, taken at arrows 2—2 in FIG. 1.

Referring to FIG. 2, vertical slot 38 has guide pin 32 resident therein. The combination of guide pin 32 and height adjustment screw 28, both residing in vertical slot 38, limits travel of second conduit 24, during adjustment, to movement in the vertical direction as indicated by arrow A.

Also in FIGS. 1 and 2, second conduit 24 is seen to have two portions, an upper portion 24A, which telescopes with first conduit 22, and a lower portion 24B which is skew to upper portion 24A. Lower portion 24B tapers from the juncture with upper portion 24A to discharge end 26 which is parallel to the die table. Other configurations of second conduit 24, such as a straight, non-tapered, non-skewed vertically oriented pipe, are also suitable. Slot 38 is preferably positioned and dimensioned so that as conduit vertical support member 30 and second conduit 24 are lowered, screw 28 contacts the upper extremity of slot 38 before discharge orifice 26 contacts table 14.

Figure 3:
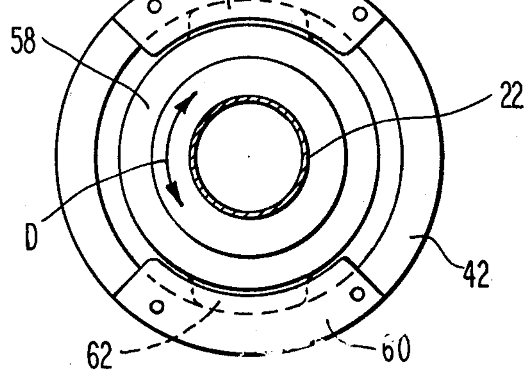
FIG. 3 is a sectional view taken at arrows 3—3 in FIG. 1.
Figure 4:
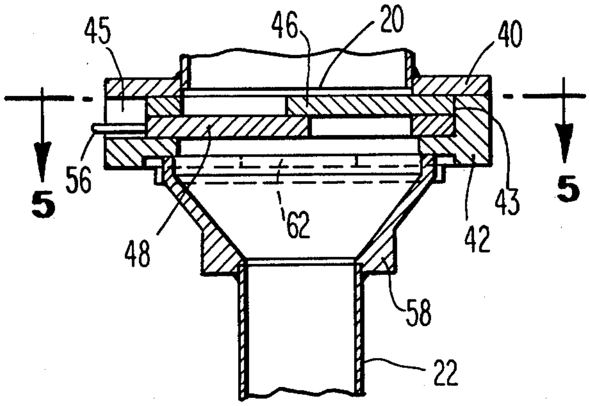
FIG. 4 is a broken sectional view taken at arrows 4—4 in FIG. 2.

The details of valve 18 are best shown in FIGS. 2, 3 and 4. Valve 18 generally includes a circumferential ring-like upper plate 40 secured to hopper 12 at hopper bottom outlet 20, and an intermediate spacer member 42 secured to upper plate 40 by screws 44. Within the hollow interior of spacer 42 are two pellicular disks, in sliding contact with each other, first upper pellicular disk 46 and lower second pellicular disk 48. These two disks are preferably rotatable about a common axis within the hollow circular interior of intermediate spacer member 42. An annularly configured vertical interior surface 43 of spacer member 42 is a bearing surface contacting the outer circumference of pellicular disks 46 and 48 as these disks are rotated to open or close the valve.

Figure 5:
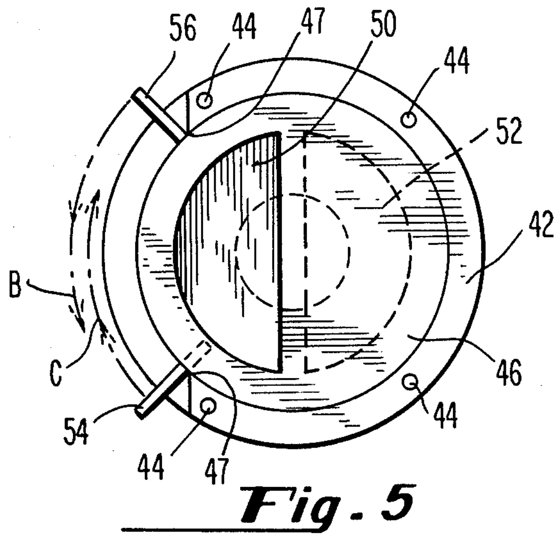
FIG. 5 is a sectional view of the valve of the powder feed apparatus, showing the valve closed, taken at arrows 5—5 in FIG. 4.
Figure 6:
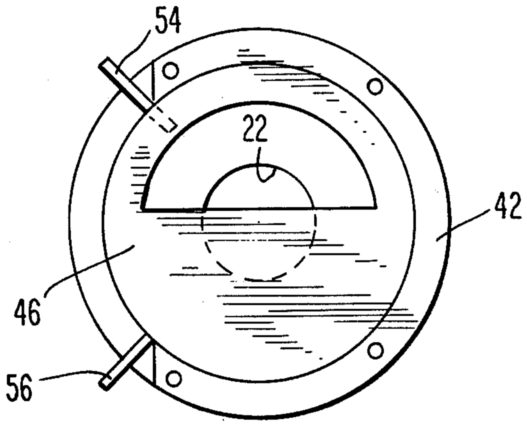
FIG. 6 is a sectional view of the valve of the powder feed apparatus, showing the valve open, taken at arrows 5—5 in FIG. 4.

Movement of first and second pellicular disks 46 and 48 to open or close the valve is best shown in FIGS. 5 and 6. Handle tabs 54 and 56 allow manual rotation of first and second pellicular disks 46 and 48 respectively. These handle tabs extend from their respective pellicular disks through a cutout portion 45 of spacer member 42. First and second pellicular disks 46 and 48 each have holes therethrough, hole 50 being through first pellicular disk 46 and hole 52 being through second pellicular disk 48. Holes 50 and 52 are preferably, but not necessarily, in the form of sectors of circles, as shown. Whatever the form of holes 50 and 52, they are disposed so that they do not communicate when handle tabs 54 and 56 are in a first position, such as is shown in FIG. 5 where the tabs are fully separated, with separation defined by contact with opposed vertical edge portions 47 which define the extremity of cutout 45 in spacer member 42. Holes 50 and 52 communicate when handle tabs 54 ad 56 have been moved, in the directions shown by arrows B and C in FIG. 5, to the position illustrated in FIG. 6 where handle tabs 54 and 56 have effectively exchanged positions. Thus, the configuration shown, powder flow is adjustable from the no-flow condition by movement of handle tab 56 in the direction shown by arrow B in FIG. 5 and by simultaneous movement of handle tab 54 in the direction shown by arrow C in FIG. 5. Once the handle tabs have attained the position in FIG. 6, full flow of powder is assured. Flow can be adjusted according to the type of powder being processed and according to the rate at which tablets are being manufactured, by apropriate positioning of handle tabs 54 and 56 intermediate the locations shown in FIGS. 5 and 6. Flow can also be adjusted by moving second conduit 24 up or down, in the direction indicated by arrow A, by loosening screw 28, adjusting second conduit 28 to obtain the desired vertical separation of discharge orifice 26 from die table 14, and retightening screw 28.

Easy removal of powder feed frame 16 without disturbing hopper 12 and valve 18 is facilitated by a bayonet connection of funnel 58 to the underside of valve 18 which allows a quick disconnection of the funnel from the valve. This is best shown in FIG. 3. The upper portion of funnel 58 is equipped with two opposed horizontally extending ears 62. The bottom portion of intermediate spacer member 42 is equipped with two opposed horizontally extending pellicles 60, with inside diameter measured therebetween being less than an outer diameter measured accross ears 62. Thus when ears 62 are disposed above pellicles 60, funnel 58 is effectively suspended from intermediate spacer 42. Rotation of funnel 58 by a quarter turn, in either direction as shown by arrow D in FIG. 3, moves ears 62 from their positions above pellicles 60, freeing funnel 58. Once funnel 58 has been disengaged from hopper 12, and first conduit 22 extending from funnel 58 has been lowered into second conduit 24, feed frame 16 may be removed to facilitate changing of the tablet forming punches and dies. Moreover, if desired, the entire powder feed apparatus can be removed and later reinstalled without changing the preselected clearance between orifice 26 and table 14.

Variations, including reversals of parts from those shown and other modifications, fall within the scope of this invention. The above particular description is by way of illustration and not of limitation. Changes, omissions, additions, substitutions, and/or other modifications may be without departing from the spirit of the invention. Accordingly, it is intended that the patent shall cover, by suitable expression in the claims, the various features of patentable novelty that reside in the invention.

We claim the following:

1. In a rotary tabletting press including a die table rotatable about an axis, apparatus for feeding tabletting powder to said table, comprising:

a. a storage hopper, mounted on said press, having a bottom powder discharge orifice;

b. a first removable conduit extending downward from said hopper, communicating with said orifice;

c. a second conduit in vertically adjustable telescoping engagement with at least a lower portion of said first conduit, having a discharge end proximate said table for dispensing tabletting powder to said table; and d. a feed frame, connected to said press, surrounding a lower portion of said second conduit including said discharge end thereof, having a lower surface parallel said table for limiting escape of tabletting powder from said table as tabletting powder is dispensed from said second conduit discharge end.

2. Apparatus of claim 1 further comprising valve means, interposed between said hopper and said first conduit, for closing said orifice thereby preventing downward flow of powder from said hopper.

3. Apparatus of claim 2 further comprising adjustable means for retaining said second conduit, in telescoping engagement with said first conduit, at a fixed position whereby said second conduit discharge end is a preselected distance from said table upper surface.

4. Apparatus of claim 2 wherein said closure valve means comprises pellicular means moveable between a first position at which said hopper bottom orifice is closed and a second position at which said hopper bottom orifice is at least partially open.

5. Apparatus of claim 4 wherein said pellicular means is slideable horizontally between said first and second positions.

6. Apparatus of claim 4 wherein said pellicular means further comprises first and second contiguous pellicular disks in sliding contact with each other, each rotatable about a common axis and having a hole therethrough, said holes communicating with each other thereby permitting powder flow therethrough when said disks are at said second position, said holes being blocked by a solid portion of the contiguous disk when said disks are at said first position.

7. Apparatus of claim 2 wherein said discharge end of said second conduit is parallel said table.

8. Apparatus of claim 7 wherein an upper portion of said second conduit telescopes with said first conduit and a lower portion of said second conduit tapers from the juncture of said first and second portions to said discharge end.

9. Apparatus of claim 8 wherein said upper and lower portions of said second conduit are skew.

10. Apparatus of claim 1 further comprising a bayonet connection between said closure means and said first removable conduit.

11. In a rotary tabletting press including a die table rotatable about an axis, apparatus for feeding tabletting powder to said table, comprising:

a. a storage hopper, mounted on said press, having a bottom powder discharge orifice;

b. valve means for closing said orifice thereby preventing downward flow of powder from said hopper;

c. a removable conduit extending downward from said valve means, having a discharge end proximate said table for dispensing tabletting powder to said table; and d. a feed frame, connected to said press, surrounding said discharge end of said conduit, having a lower surface parallel said table for limiting escape of tabletting powder from said table as tabletting powder is dispensed from said conduit discharge end.

12. In a rotary tabletting press including a die table rotatable about an axis, apparatus for feeding tabletting powder to said table, comprising:

a. a storage hopper, mounted on said press, having a bottom powder discharge orifice;

b. valve means, for closing said orifice thereby preventing downward flow of powder from said hopper, comprising first and second contiguous pellicular disks in contact with each other, each disk slideable horizontally between first and second positions, each disk rotatable about a common axis and having a hole therethrough, said holes communicating with each other thereby permitting powder flow therethrough when said disks are at said second position, said holes being blocked by a solid portion of the contiguous disk when said disks are at first position;

c. a conduit extending downward from said valve means, having a discharge end proximate said table for dispensing tabletting powder to said table; and d. a feed frame, connected to said press, surrounding a lower portion of said conduit including said discharge end thereof, having a lower surface parallel said table for limiting escape of tabletting powder from said table as tabletting powder is dispensed from said discharge end.

* * * * *